United States Patent
Dill (10) Patent No.: US 10,692,164 B2
(45) Date of Patent: Jun. 23, 2020

(54) METHODS AND SYSTEMS FOR ESTABLISHING IDENTITY CONFIDENCE DATABASE

(71) Applicant: The Western Union Company, Englewood, CO (US)

(72) Inventor: Matthew Leland Dill, St. Helena, CA (US)

(73) Assignee: The Western Union Company, Denver, CO (US)

(*) Notice: Subject to any disclaimer, the term of this patent is extended or adjusted under 35 U.S.C. 154(b) by 234 days.

(21) Appl. No.: 15/945,526

(22) Filed: Apr. 4, 2018

(65) Prior Publication Data

US 2018/0232837 A1 Aug. 16, 2018

Related U.S. Application Data

(63) Continuation of application No. 14/277,012, filed on May 13, 2014, now Pat. No. 9,953,387, which is a continuation of application No. 12/428,348, filed on Apr. 22, 2009, now Pat. No. 8,762,288.

(51) Int. Cl.
*G06Q 50/26* (2012.01)
*G06Q 30/02* (2012.01)
*G06Q 30/06* (2012.01)
*G06Q 40/00* (2012.01)
*G06Q 20/40* (2012.01)

(52) U.S. Cl.
CPC ........ *G06Q 50/265* (2013.01); *G06Q 30/02* (2013.01); *G06Q 30/0201* (2013.01); *G06Q 30/06* (2013.01); *G06Q 40/00* (2013.01); *G06Q 40/12* (2013.12); *G06Q 20/4014* (2013.01); *G06Q 20/4016* (2013.01)

(58) Field of Classification Search
None
See application file for complete search history.

(56) References Cited

U.S. PATENT DOCUMENTS

| 6,070,141 | A | * | 5/2000 | Houvener | ........... G06Q 20/206 705/76 |
| 7,246,740 | B2 | | 7/2007 | Swift et al. | |
| 7,500,599 | B2 | * | 3/2009 | Swift | ..................... G06Q 20/04 235/379 |

(Continued)

FOREIGN PATENT DOCUMENTS

| EP | 2394243 | 12/2011 |
| WO | 2010123621 | 10/2010 |

OTHER PUBLICATIONS

Extended European Search Report dated Jan. 10, 2013 in Application No. EP 10722282.0, 3 pages.

(Continued)

*Primary Examiner* — Allen C Chein
(74) *Attorney, Agent, or Firm* — Kilpatrick, Townsend & Stockton, LLP (57) ABSTRACT

The invention provides various systems and methods for establishing an identity confidence scoring system. The method includes gathering identity information about the customers from physical locations and from remote locations. The method updates the identity profiles with the gathered identity information, and based on the gathered identity information, generates an identity confidence score associated with each identity profile.

20 Claims, 5 Drawing Sheets

(56) References Cited

U.S. PATENT DOCUMENTS

| | | |
|---|---|---|
| 8,762,288 B2 | 6/2014 | Dill |
| 9,953,387 B2 | 4/2018 | Dill |
| 2004/0245330 A1 | 12/2004 | Swift et al. |
| 2005/0097320 A1 | 5/2005 | Golan et al. |
| 2005/0125350 A1 | 6/2005 | Tidwell et al. |
| 2006/0161435 A1 | 7/2006 | Atef et al. |
| 2006/0204051 A1 | 9/2006 | Holland |
| 2006/0287004 A1 | 12/2006 | Fuqua |
| 2008/0103972 A1 | 5/2008 | Lanc |
| 2009/0119170 A1* | 5/2009 | Hammad ............ G06Q 10/087 705/14.17 |

OTHER PUBLICATIONS

International Search Report and Written Opinion of related International Application No. PCT/US2010/025051 dated Apr. 13, 2010, 8 pages.

U.S. Appl. No. 14/277,012, filed May 13, 2014 Non-Final Rejection dated Dec. 1, 2016, all pages.

U.S. Appl. No. 14/277,012, filed May 13, 2014 Final Rejection dated Mar. 22, 2017, all pages.

U.S. Appl. No. 12/428,348, filed Apr. 22, 2009 Non-Final Rejection dated May 10, 2011, all pages.

U.S. Appl. No. 12/428,348, filed Apr. 22, 2009 Final Rejection dated Oct. 13, 2011, all pages.

U.S. Appl. No. 12/428,348, filed Apr. 22, 2009 Non-Final Rejection dated Apr. 10, 2013, all pages.

U.S. Appl. No. 12/428,348, filed Apr. 22, 2009 Final Rejection dated Sep. 12, 2013, all pages.

\* cited by examiner

METHODS AND SYSTEMS FOR ESTABLISHING IDENTITY CONFIDENCE DATABASE

CROSS-REFERENCE TO RELATED APPLICATION

This application is a continuation of U.S. patent application Ser. No. 14/277,012, filed May 13, 2014, entitled "METHODS AND SYSTEMS FOR ESTABLISHING IDENTITY CONFIDENCE DATABASE," which is a continuation of U.S. patent application Ser. No. 12/428,348, filed on Apr. 22, 2009, issued as U.S. Pat. No. 8,762,288 on Jun. 24, 2014, and entitled "METHODS AND SYSTEMS FOR ESTABLISHING AN IDENTITY CONFIDENCE DATABASE." The entire disclosures of the above applications are hereby incorporated herein by reference, for all purposes, as if fully set forth herein.

FIELD OF THE INVENTION

The present invention relates, in general, to identity verification, and more particularly, to managing an identity database(s) and establishing an identity confidence scoring system.

BACKGROUND OF THE INVENTION

Presently, particularly in developing countries, identity verification systems are marginal at best. Often in developing countries residents do not have identification (ID) cards (e.g., driver's licenses, social security number (SSN) cards, military IDs, etc.) to verify identity. Furthermore, such countries typically lack banking or other financial networks established in order to adequately gather identification information.

In addition, many laws and guidelines require financial and lending institutions to "know your customer" (KYC) before entering into financial transactions. Hence, in these developing countries, without proper identification, entering into financial and other similar transactions becomes increasingly more difficult. Accordingly, improvements in the art are needed.

BRIEF SUMMARY OF THE INVENTION

Embodiments of the present invention relate to building confidence in a customer's identity. As confidence in a customer's identity increases, the customer's options may be increased and the limitations decreased. Furthermore, based on the additional identity information received from a successful verification, an unsuccessful verification, or no verification attempt, the customer's identity confidence score may be updated accordingly Hence, each piece of identity information, and each transaction may be utilized to maintain an accurate identity confidence score for each customer.

The present invention provides a method for establishing an identity confidence scoring system. The method includes gathering identity information about the customers from physical locations and from remote locations. The method updates the identity profiles with the gathered identity information, and based on the gathered identity information, generates an identity confidence score associated with each identity profile.

The present invention further provides a system for maintaining an identity confidence scoring system. The system includes a host computer configured to process transactions for an account of a customer, capture transaction data for each of the transactions, analyzing the transaction data for each of the transactions, and use the analysis to identify the customer. The host computer is further configured to identify transactions which exceed a transaction amount threshold. Based on one of the transactions exceeding the threshold, a device receives a verification request. The device then transmits a response to the host computer providing proper verification, and the host computer updates the customer's identity confidence score based on the receiving of the response with the proper verification.

A further embodiment of the present invention provides a machine-readable medium for establishing an identity confidence scoring system. The machine-readable medium includes instructions for gathering identity information about the customers from physical locations and from remote locations. The machine-readable medium includes instructions for updating the identity profiles with the gathered identity information, and based on the gathered identity information, generating an identity confidence score associated with each identity profile.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

The invention provides various systems and methods for managing an identity database(s) and establishing an identity confidence scoring system. Accurate identification of customers and recipients is of the utmost importance when dealing with financial transactions. In many instances, government and other restrictions and guidelines require proper identification of customers and recipients before financial transactions are allowed to occur. Accordingly, aspects of the present invention are directed at determining an identity confidence level for each customer. Such a confidence score may be stored in a database, and as more identity information (e.g., the number of transactions, monetary amount of the transactions, branch location identification verification, etc.) is gathered, the confidence score can be adjusted accordingly.

Such an identity confidence score may be generated based on a combination of identity sources. For example, information from the banking system the customer utilized may be used, the customer's cellular telephone provider may be used, the customer's interactions with agents at branch and agent locations may be used, etc. Ultimately, a wide variety of identity information sources may be used in order to provide the most accurate representation of the identity of each customer.

Further embodiments of the present invention relate to facilitating developing markets in establishing identity confidence for customers using remote devices to enter into financial transactions. Particularly, where limited history of identity information is available about customers, the present invention provides a collection of such information in an organized and usable fashion.

Figure 1:
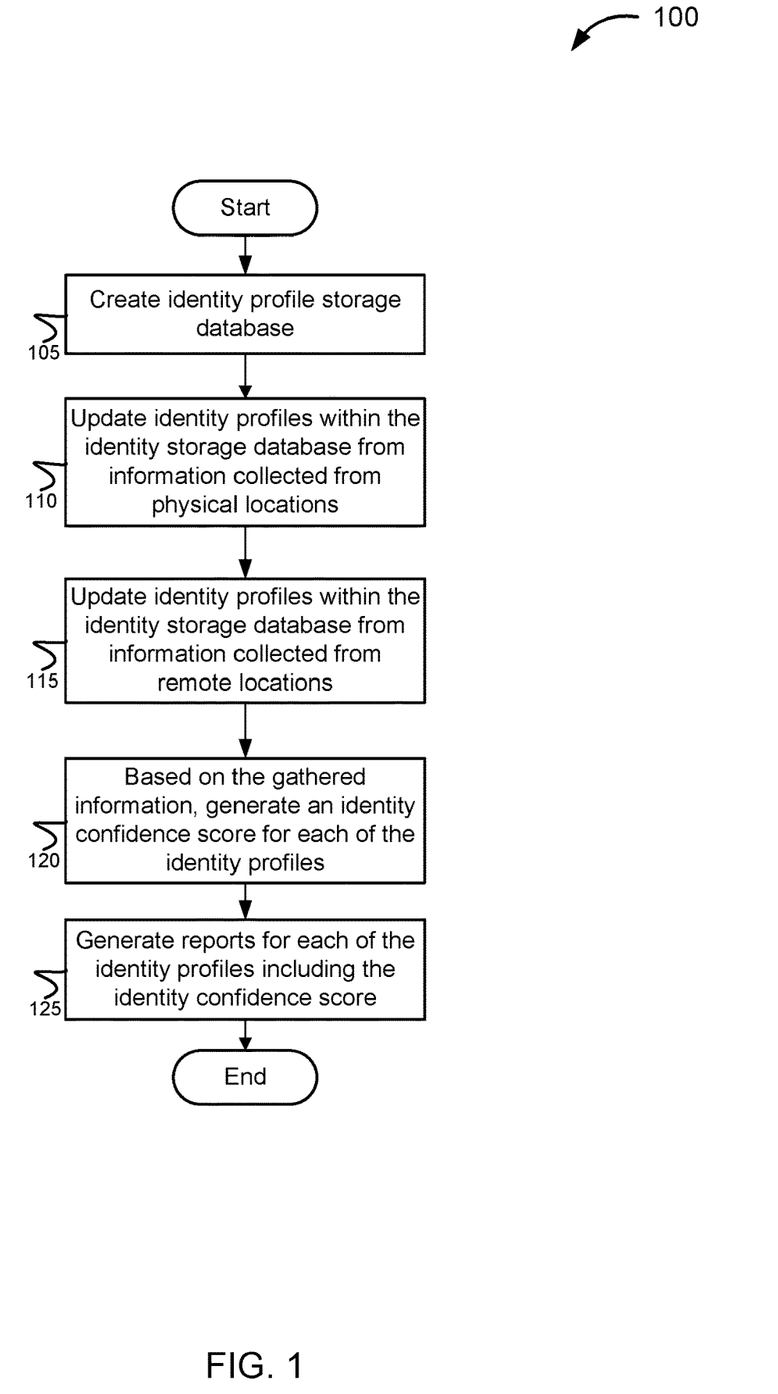
FIG. 1 is a flow diagram illustrating a method of managing an identity confidence scoring system, according to one embodiment of the present invention.

Turning now to FIG. 1, which illustrates a method 100 of managing an identity confidence scoring system, according to one embodiment of the present invention. At process block 105, an identity database storage mechanism may be created. Such a database may be implemented using identity profiles for each customer within the database. An identity profile, for example, would include any identity information and transaction information about each customer. For example, the customers name, address, telephone number, etc., as well as banking, utilities, cellular telephone information. Furthermore, the customer's transaction history may include the number of transactions, the frequency of transactions, the monetary amount of each transaction, etc.

In one embodiment, the information gathered may be information that typically is not gathered. For example, each instance that a customer entered into an agent location of a bank branch office (i.e., physical locations), such information would be captured and input into the customer's identity profile. Essentially any usable identity information source can be utilized in order to generate a fuller, more accurate identity profile for each customer.

Additional "physical locations" may include a cellular telephone provider office, other utilities office locations in which the customer visits, a government office, a convenience store, a shopping center, or any other location where the customer presents identification and engages in financial transactions. In most instances, when a customer enters, for example, a cellular telephone providers' office location, the customer is required to first provide proper identification. For example, a customer desiring to pay their bill would first need to identify the account they wish to pay, and verify that they are the account owner (or other representative). Such identity information would be collected and used to update the customer's identity profile (process block 110). For example, if the customer presented an ID, the ID was verified, and then the customer paid their bill with a stored value card, all of that information would be collected and used to update the customer's identity profile. In one embodiment, the ID presented may be a government issued ID. In one embodiment, some or all of the information collected about the customer(s) may be utilized to establish an identity confidence score.

In one embodiment, the type of ID presented as well as the type of the location in which the customer is presenting the ID have an effect on the identity confidence score assigned to the customer. For example, if the customer is presenting a government issued ID at a bank branch office, and the bank verifies the identity of the customer, then the customer would be given a significant "score increase." This is due to the fact that the reliability of the government ID and the banks' "trustworthiness" is high. Conversely, if the customer enters a gas station or convenience store and presents a university ID, the increase in the customer's confidence score would be significantly less, due to the fact that the gas stations is much less reliable than a bank, and the university ID is much less reliable than a government ID.

In a further embodiment, the frequency of transactions also effect the customer's identity confidence score. For example, if the customer transfers funds (even a small amount) to a relative via wire transfer weekly for 12 months, then such activity would increase the customer's identity confidence score. Alternatively, if the customer ceases to make any transfers and/or transactions for the next 6 months, then the confidence in the customer's identity would begin to decrease. Furthermore, occurrences charge-backs, fraudulent transactions, failed identity verifications, etc. can effect the identity confidence score of the customer. Hence, the confidence in a customer's identity is dynamically updated as more information (both positive and negative) regarding the customer's identity is gathered.

In developing countries, in particular, credit rating in many cases is of less importance than confidence in an individual's identity. For example, a micro lender may not be concerned with how much financial backing the customer has for the microloan, but may be more concerned with being sure that the lender knows exactly as to whom they are lending money to, and if they person is really who they claim to be. Hence, even if the customer does not have a credit rating or score, the lender may still be comfortable lending the customer money if the customer has a high "identity confidence score."

In a further example, the customer enters a money transfer agent location to request a money transfer. The agent working would request from the customer: ID, a money transfer amount, a recipient, etc. The agent would then generate a report or the like detailing the information gathered during the transaction. Subsequently the information could be transmitted to the identity confidence database, and used to update the customer's profile. In one embodiment, if the individual entering the agent location is a new customer, then a new customer profile may be generated. Other such "physical locations" may include in-line transactions, point-of-sale (POS) device transactions, bank branch locations, etc.

Furthermore, as the customer's identity profile becomes more "complete" with more history and transaction, as well as additional identity verifications, the customer may be granted more rights with fewer restrictions. For example, after five money transfer transactions at an agent location with proper identity verification, the customer is able to execute "remote location" transactions. In one embodiment, a "remote location" may include a transaction from a website, or the like, a mobile wallet transaction, a transaction from a cellular or other portable device, an automated teller machine (ATM) transactions, etc. As such, information gathered from such "remote locations" may be used to update the customer's identity profile (process block 115).

In one embodiment, if the customer is using a cellular telephone (or personal digital assistant (PDA)) to complete a remote transaction, the customer's phone number, account number, and any other personal information associated with the cellular account may be captured and updated within the customer's identity profile. Additionally, if a customer initiates a web-based money transfer (or other financial transaction), the customer's internet protocol (IP) address, internet provider, web profile account information, etc. may be collected and used to update the customer's identity profile.

In a further embodiment, "remote transactions" effect the customer's confidence score in a different way than "physical transaction" as described above. For example, an online "card not present" transaction would increase the customer's identity confidence score by very little due to the fact that a minimal amount of identity checking occurs. Whereas, an e-wallet transaction which requires, for example, a login, password, security questions, etc. would provide a greater increase in the customer's identity confidence score. Furthermore, the more successful remote transactions the customer engages in over time, the greater the increase in the customer's identity confidence score. Additionally, the increase in the confidence score may be a cumulative increase, or alternatively, the increase may be an exponential increase, nonetheless, as a customer has positive identity interactions the identity confidence score will increase, and as the customer has negative identity interactions the identity score will decrease.

At process block 120, based on the information gathered and stored in each of the customer's identity profiles, an identity confidence score may be generated. Such a score may be based on a variety of factors. For example, each customer may start with a base score (e.g., 500 points) and each new piece of identity information added to their identity profile may leave the same, add to, or subtract from the identity confidence score. For example, each instance of a successful transaction may add five points to the score. Each transaction over a certain monetary amount may add ten points to the score. Furthermore, each successful identity verification may add additional points to the score.

Similarly, each unsuccessful transaction may subtract ten points from the identity confidence score, or each unsuccessful identity verification may deduct fifty points from the score. Furthermore, certain types of identity information may have a greater weight than other types of identity information. For example, identity verification attempts (either successful or unsuccessful) may have a greater weight than the customer's IP address. Accordingly, the identity confidence score may be generated as a weighted summed total of all the identity information included in the customer's profile such that the more positive identity information the higher the customer's score would be, and similarly the more negative identity information the lower the score.

At process block 125, reports may be generated for each customer identity profile which would include the identity confidence score. Thus, based on the reported score, each customer may be granted a certain level of access for performing financial transactions. For example, each customer with a score over 700 points is able to initiate money transfers at any monetary amount and from any remote or physical location. In contrast, each customer at 200 points or lower are only allowed to initiate transactions below a set monetary amount, and can only initiate transactions at a physical location. Accordingly, as confidence in a customer is increased, that customer is granted additional privileges with fewer restrictions; and, conversely, as the confidence score decreases, the customer has privileges removed and more restrictions applied.

Figure 2:
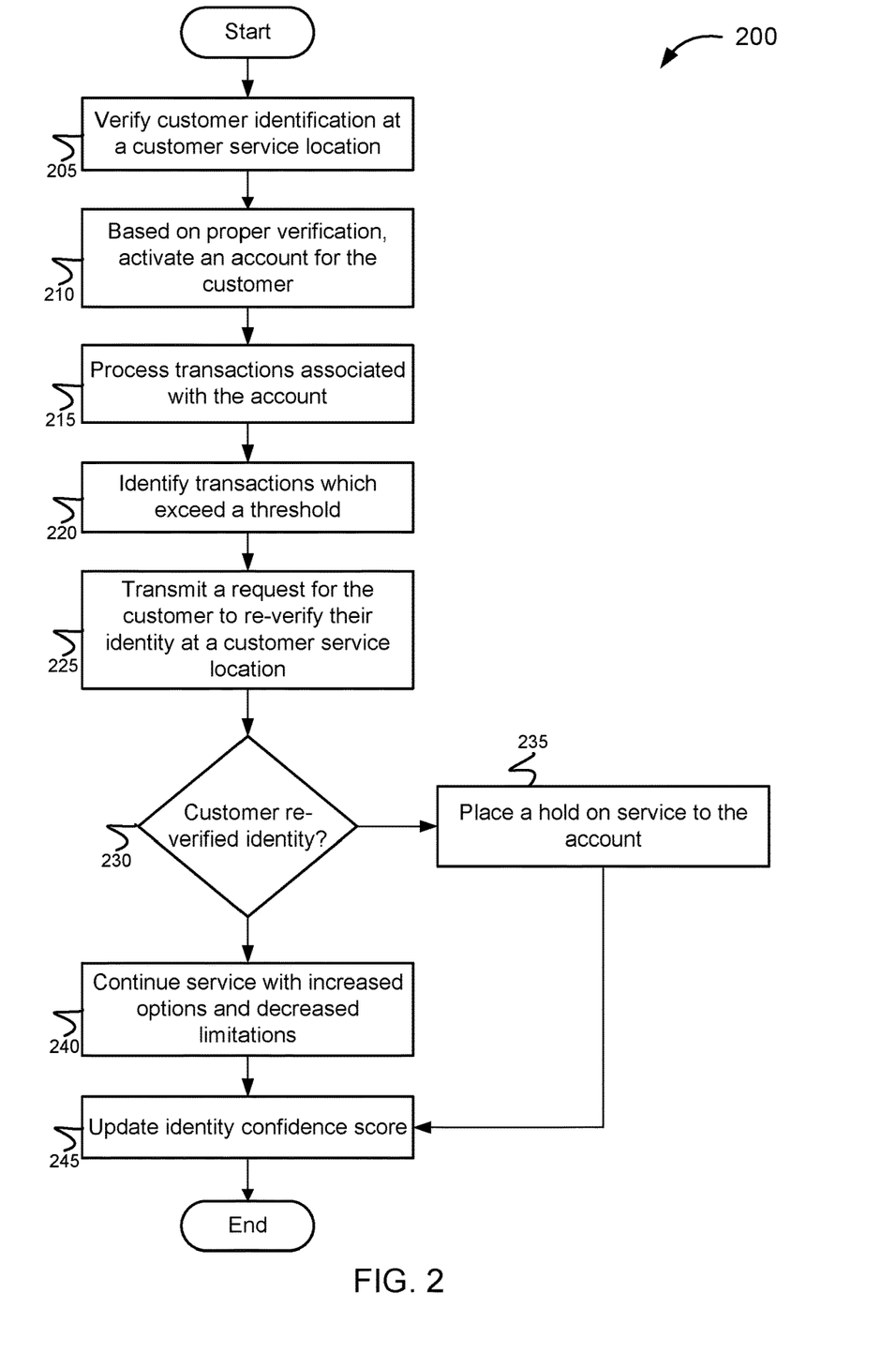
FIG. 2 is a flow diagram illustrating a method of utilization of an identity confidence scoring system, according to one embodiment of the present invention.

Referring now to FIG. 2, which illustrates a method 200 of utilization of an accumulation of identity transaction in order to generate identity confidence scores, according to one embodiment of the present invention. At process block 205, a customer's identity may be verified at a customer service (or agent) location. Such a verification process may include checking the customers ID, checking a cellular telephone bill or the like, verifying a government identification number or card, etc. In one embodiment, any identity information may be utilized in order to verify the identity of the customer.

As described above the identity information presented at the agent location would be gathered and transmitted and stored in an identity profile for the customer. At process block 210, based on proper and successful identification of the customer, a customer account may be activated. The customer account may be activated on a provisional or limited basis in order to allow for the gathering of additional identity information as well as allowing for a history with the customer to be developed.

At process block 215, the financial transaction may be processed. For example, the transaction may be a money transfer, a request for money, a purchase of a stored value card, loading additional value on a stored value card, etc. Nonetheless, any type of financial transaction may be processed. The customer may then be granted the ability to generate transaction requests of a certain type and/or up to a certain amount. In other words, the customer's account may have various restrictions placed on it, based on the limited identity information gathered about the customer.

Furthermore, transaction requests for the customer may be monitored to identify whether a transaction has exceeded a threshold (process block 220). In one embodiment, the threshold may be a transaction amount threshold, a transaction destination location, a number of transactions threshold, etc. The threshold may be utilized to "flag" certain transaction requests as needing additional verification prior to executing the transaction.

At process block 225, based on the identification of a transaction request which exceeds the threshold, the customer may be sent a request to re-verify their identity at, for example, an agent location. The transaction may be locked until the customer properly re-verifies their identity. The request may be, for example, a short message service (SMS) text message indicating that the customer needs to re-verify their identity. Alternatively, the request may be an email message, a voice mail message, etc. indicating the re-verification requirement. In an alternate embodiment, the request may simply include a "challenge" question such as, the customer's date of birth, the customer's address, etc. which, if answered correctly, may be sufficient for re-verification. The type of re-verification required may be based on the customer's identity confidence score (i.e., the higher the score, the less strict the re-verification process; the lower the score, the more strict).

At decision block 230, a determination is made whether the customer has properly re-verified their identity (i.e., has the customer visited an agent location, did the customer properly answer the challenge questions, etc.). If the customer fails to properly re-verify their identity then, at process block 235, a hold may be placed on the customer's account. Accordingly, the current transaction as well as any subsequent transactions would be denied until the customer properly re-verifies their identity.

Alternatively, if the customer does successfully re-verify their identity then, at process block 240, the current transaction would be executed, and service to the account would continue. In one embodiment, the customer's options may be increased and the limitations decreased. Furthermore, based on the additional identity information received from a successful re-verification, an unsuccessful re-verification, or no re-verification attempt, the customer's identity confidence score may be updated accordingly (process block 245). Hence, each piece of identity information, and each transaction may be utilized to maintain an accurate identity confidence score for each customer.

In an alternative embodiment, a third-party mobile network operator (MNO) (i.e., Vodafone, Smart communications, Att, Globe, etc.) may be able to utilize the customer confidence and verification data to verify their customers' identities. For example, MNO would enter into an agreement with the identity gathering entity to utilize such identity confidence information to verify the identities of their customers. For example, if the MNO desires to add a new customer, the customer might first be directed to an agent location for the identity gathering entity where the customer would be asked to present identification, the cellular device, etc. Then, based on the information (if any) stored about the new customer, a report to the MNO could be generated indicating whether or not the new customer's identity could be verified. In essence, the identity gathering entity becomes an identity confidence broker to third-party MNOs, by using the established infrastructure and collected data to provide a level of confidence regarding the new customer's identity.

Figure 3:
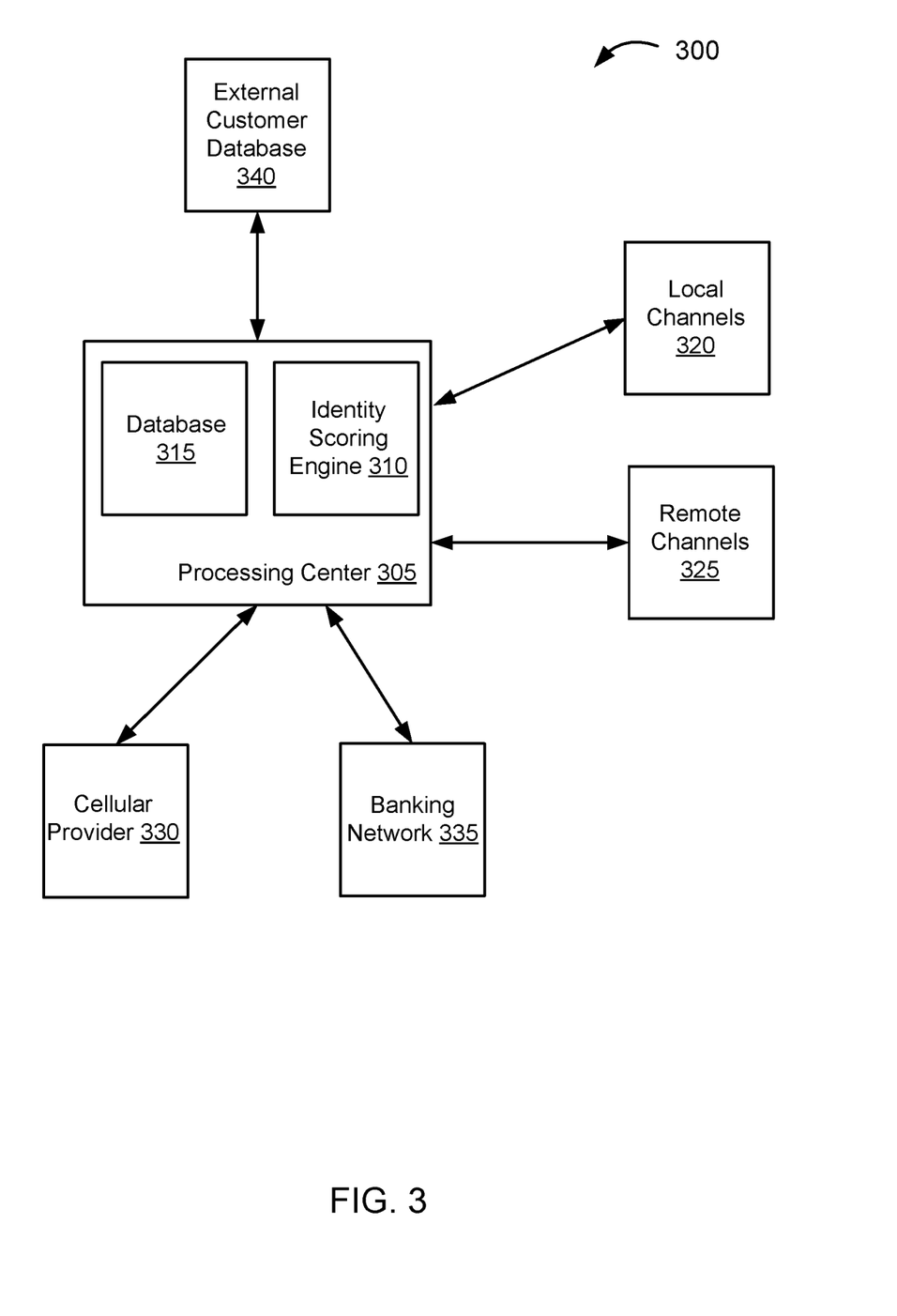
FIG. 3 is a block diagram illustrating a system for managing an identity confidence scoring system, according to one embodiment of the present invention.

Turning now to FIG. 3, which illustrates a system 300 for managing identity related information and generating an identity confidence scoring system, according to one embodiment of the present invention. In one embodiment, system 300 may include a processing center 305, which may further include an identity scoring engine 310 and a database 315. Identity scoring engine 310 may be used to generate an identity confidence score for each customer based on information received about each customer.

In one embodiment, database 315 may be configured to store a customer identity profile for each customer with identity information associated with each profile. Alternatively, database 315 may be an aggregation of identity information gathered from many different sources. Identity scoring engine 310 may be granted access to the identity information stored in database 315 in order to generate an identity confidence score for each customer. In a further embodiment, system 300 may further include local channels 320, remote channels 325, as well as cellular provider 330, banking network 335, and external customer database 340.

In one embodiment, local channels 320 may include locations in which customer interactions are carried out in person. For example, at a customer service location, an agent location, a utilities office, a bank branch location, etc. In one embodiment, local channels 320 may be used to gather identity information about customers, to verify (or re-verify) customer identities, and process transaction requests. Furthermore, local channels 320 may be coupled with processing center 305 in order to send and receive identity and other information about customers and customer transactions.

In a further embodiment, the customer's SIM card may be used to record when and what identification has been checked for the customer. Further, a mobile devices' camera (or other recording apparatus) may be used to photograph the sender and/or sender's ID which may then be included in identity database 315. as such, an additional layer of confidence may be placed in the customer's identity. Additionally, automatic number identification (ANI), or the like may be captured for the customer and stored in identity database 315.

In a further embodiment, remote channels 325 may include web-based interactions (e.g., transactions through a web browser, a PDA browser, etc.), mobile transactions (e.g., cellular device transactions, PDA transactions, etc.), ATMs, kiosks, etc. Information retrieved from remote channels 325 may be transmitted to processing center 305 in order to be stored in database 315 and processed by identity score engine 310.

Furthermore, cellular provider 330 may be coupled with processing center 305 in order to transmit customer identity information to processing center 305. For example, cellular provider 330 may enter into an agreement with processing center 305 to share their customers' identity information. As such, processing center 305 may utilize, for example, the customers' content information, cellular telephone number, bill payment history, amount of time with cellular provider 330, etc. Furthermore, processing center 305 may utilize the cellular number as further identification for the customers. In a further embodiment, the customers' may have a mobile wallet or the like associated with the cellular account/number, which may be used by processing center 305 to collect additional identity information.

In an alternative embodiment, cellular provider 330 may be another utility provider (e.g., a power company, a gas company, an Internet provider, etc.). Furthermore, cellular provider 330 may alternatively be another service provider, such as, an insurance provider, a mortgage company, an auto loan company, etc. As such, processing center 305 is configured to gather identity information for any source in order to generate the most accurate customer identity confidence scores.

Similar to cellular provider 330, processing center 305 may be coupled with banking network 335 and external customer database 340. As with cellular provider 330, banking network 335 may be configured to share customer identity information with processing center 305. Alternatively, banking network 335 may be any financial network or entity (e.g., a credit network, a stored value network, a micro loan service, etc.). Furthermore, external customer database 340 may also be configured to share identity information with processing center 305. External customer database 340 may be configured to gather various pieces of customer information and store it in a centralized location. Accordingly, processing center 305 may be configured to gather any identity information from any available source, in order to present identity confidence scores for each customer.

Such identification may be used for identity verification in a variety of situations. For example, in initiating money transfers, bill payments, when applying for a loan (or other financial services, account based or non-account-based), applying for a government-issued ID or passport, employment verification, etc. Furthermore, such transaction may be performed through any channel (e.g., via a mobile device, on the Internet, over the phone, in person, etc.).

Figure 4:
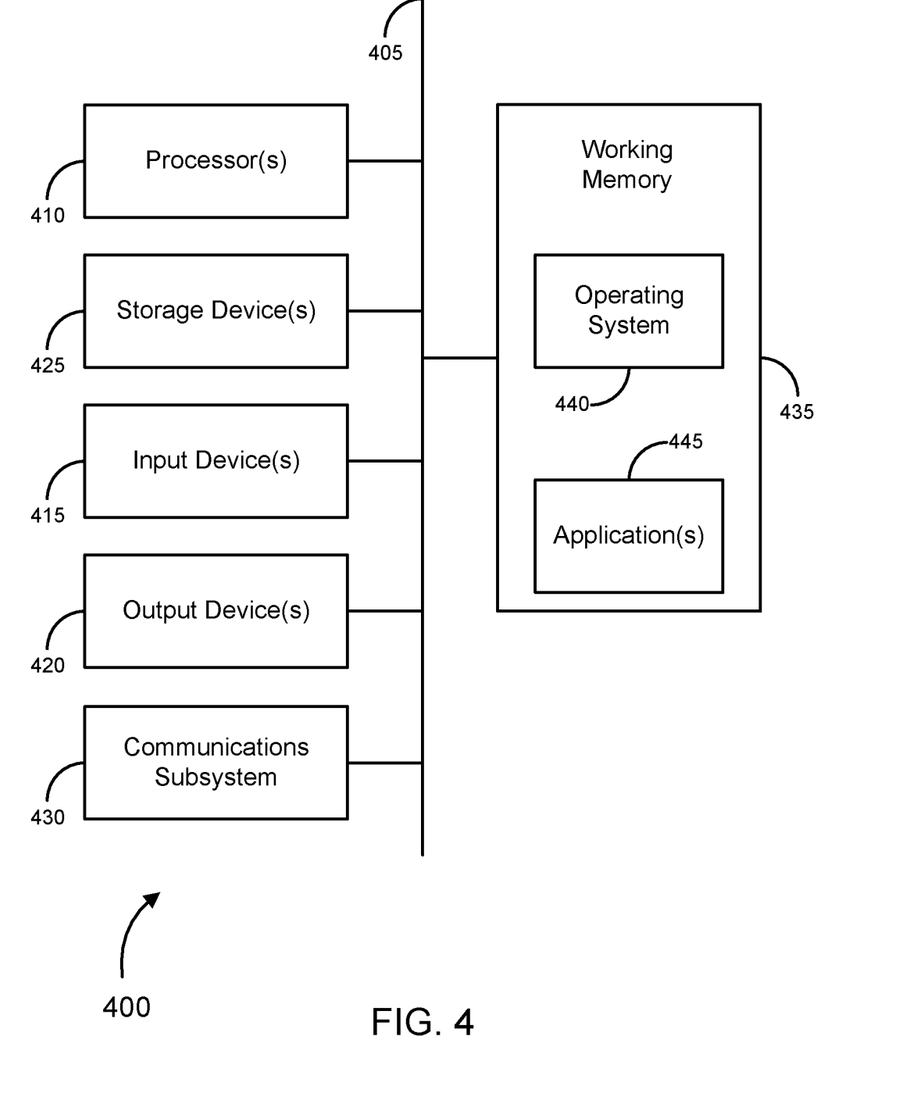
FIG. 4 is a generalized schematic diagram illustrating a computer system, in accordance with various embodiments of the invention.

FIG. 4 provides a schematic illustration of one embodiment of a computer system 400 that can perform the methods of the invention, as described herein, and/or can function as, for example, processing center 305 in FIG. 3. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements can include one or more processors 410, including without limitation one or more general-purpose processors and/or one or more special-purpose processors (such as digital signal processing chips, graphics acceleration chips, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computer system 400 might also include a communications subsystem 430, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 430 may permit data to be exchanged with a network (such as the network described below, to name one example), and/or any other devices described herein. In many embodiments, the computer system 400 will further comprise a working memory 435, which can include a RAM or ROM device, as described above.

The computer system 400 also can comprise software elements, shown as being currently located within the working memory 435, including an operating system 440 and/or other code, such as one or more application programs 445, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 425 described above. In some cases, the storage medium might be incorporated within a computer system, such as the system 400. In other embodiments, the storage medium might be separate from a computer system (e.g., a removable medium, such as a compact disc, etc.), and or provided in an installation package, such that the storage medium can be used to program a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 400) to perform methods of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another machine-readable medium, such as one or more of the storage device(s) 425. Merely by way of example, execution of the sequences of instructions contained in the working memory 435 might cause the processor(s) 410 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 400, various machine-readable media might be involved in providing instructions/code to processor(s) 410 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 425. Volatile media includes, without limitation, dynamic memory, such as the working memory 435. Transmission media includes coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc., carried by the signals) to the working memory 435, from which the processor(s) 405 retrieves and executes the instructions. The instructions received by the working memory 435 may optionally be stored on a storage device 425 either before or after execution by the processor(s) 410.

Figure 5:
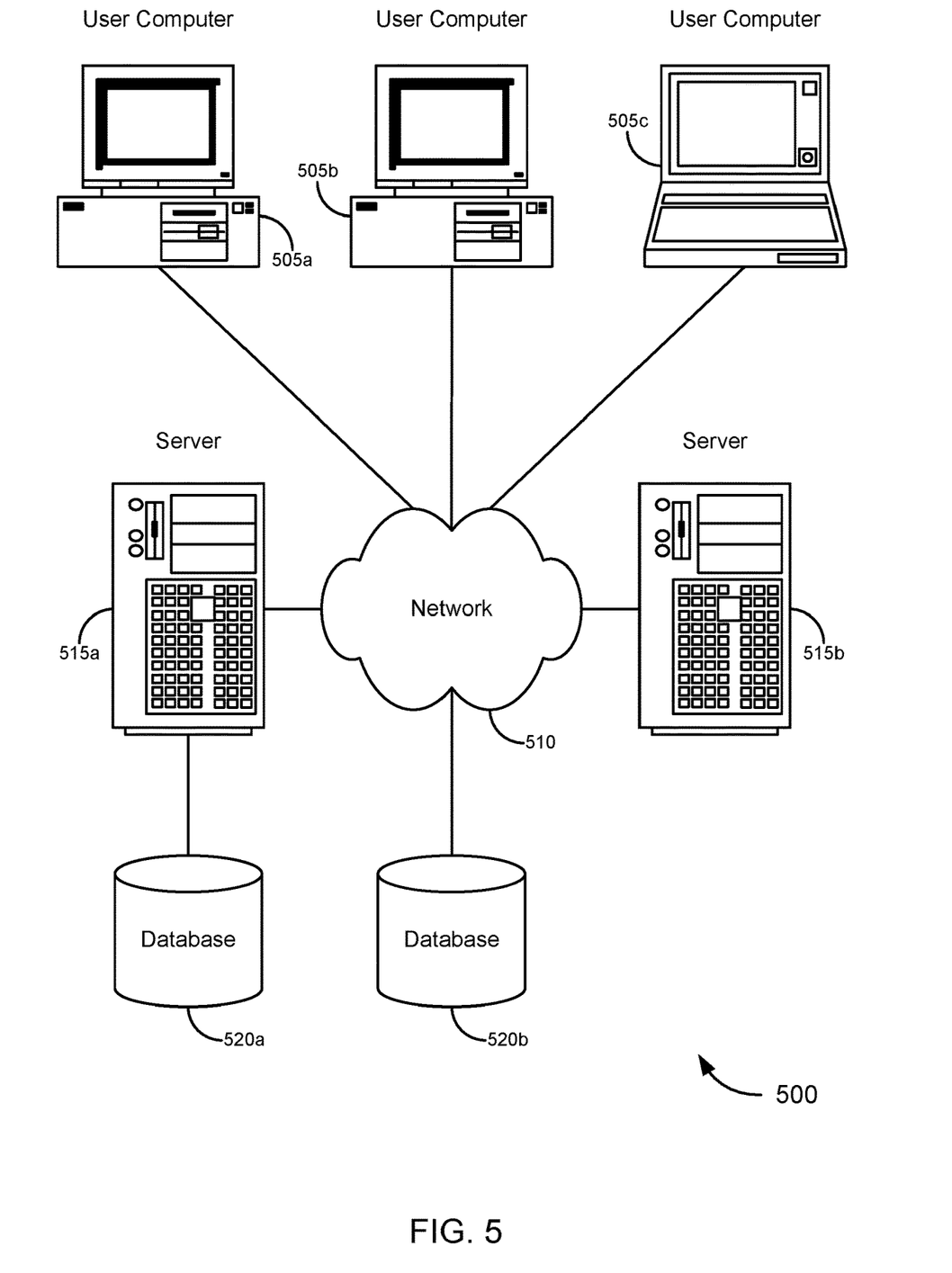
FIG. 5 is a block diagram illustrating a networked system of computers, which can be used in accordance with various embodiments of the invention.

A set of embodiments comprises systems for managing an identity information and generating an identity confidence scoring system. Merely by way of example, FIG. 5 illustrates a schematic diagram of a system 500 that can be used in accordance with one set of embodiments. The system 500 can include one or more user computers 505. The user computers 505 can be general purpose personal computers (including, merely by way of example, personal computers and/or laptop computers running any appropriate flavor of Microsoft Corp.'s Windows™ (e.g., Vista™) and/or Apple Corp.'s Macintosh™ operating systems) and/or workstation computers running any of a variety of commercially-available UNIX™ or UNIX-like operating systems. These user computers 505 can also have any of a variety of applications, including one or more applications configured to perform methods of the invention, as well as one or more office applications, database client and/or server applications, and web browser applications. Alternatively, the user computers 505 can be any other electronic device, such as a thin-client computer, Internet-enabled mobile telephone, and/or personal digital assistant (PDA), capable of communicating via a network (e.g., the network 510 described below) and/or displaying and navigating web pages or other types of electronic documents. Although the exemplary system 500 is shown with three user computers 505, any number of user computers can be supported.

Certain embodiments of the invention operate in a networked environment, which can include a network 510. The network 510 can be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 515. Each of the server computers 515 may be configured with an operating system, including without limitation any of those discussed above, as well as any commercially (or freely) available server operating systems. Each of the servers 515 may also be running one or more applications, which can be configured to provide services to one or more clients 505 and/or other servers 515.

Merely by way of example, one of the servers 515 may be a web server, which can be used, merely by way of example, to process requests for web pages or other electronic documents from user computers 505. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 505 to perform methods of the invention.

The server computers 515, in some embodiments, might include one or more application servers, which can include one or more applications accessible by a client running on one or more of the client computers 505 and/or other servers 515. Merely by way of example, the server(s) 515 can be one or more general purpose computers capable of executing programs or scripts in response to the user computers 505 and/or other servers 515, including without limitation web applications (which might, in some cases, be configured to perform methods of the invention). Merely by way of example, a web application can be implemented as one or more scripts or programs written in any suitable programming language, such as Java™, C, C #™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 505 and/or another server 515. In some embodiments, an application server can create web pages dynamically for displaying the information in accordance with embodiments of the invention, such as remote channels 325 in FIG. 3. Data provided by an application server may be formatted as web pages (comprising HTML, Javascript, etc., for example) and/or may be forwarded to a user computer 505 via a web server (as described above, for example). Similarly, a web server might receive web page requests and/or input data from a user computer 505 and/or forward the web page requests and/or input data to an application server. In some cases, a web server may be integrated with an application server.

In accordance with further embodiments, one or more servers 515 can function as a file server and/or can include one or more of the files (e.g., application code, data files, etc.) necessary to implement methods of the invention incorporated by an application running on a user computer 505 and/or another server 515. Alternatively, as those skilled in the art will appreciate, a file server can include all necessary files, allowing such an application to be invoked remotely by a user computer 505 and/or server 515. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520. The location of the database(s) 520 is discretionary: merely by way of example, a database 520*a* might reside on a storage medium local to (and/or resident in) a server 515*a* (and/or a user computer 505). Alternatively, a database 520*b* can be remote from any or all of the computers 505, 515, so long as the database can be in communication (e.g., via the network 510) with one or more of these. In a particular set of embodiments, a database 520 can reside in a storage-area network ("SAN") familiar to those skilled in the art. (Likewise, any necessary files for performing the functions attributed to the computers 505, 515 can be stored locally on the respective computer and/or remotely, as appropriate.) In one set of embodiments, the database 520 can be a relational database, such as an Oracle™ database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of establishing an identity confidence score, the method comprising:
   receiving, at a processing center server, a first set of user identity information from a first transaction device, the first set of user identity information corresponding to a first in-person transaction performed by a user at a first physical transaction location,
      wherein the first set of user identity information comprises at least (a) a transaction type of the first in-person transaction and (b) a first type of identity information provided by the user during the first in-person transaction;
   establishing a remote wireless connection, by the processing center server, to a mobile device associated with the user;
   retrieving, by the processing center server, a second set of user identity information from the mobile device associated with the user, via the remote wireless connection,
      wherein the second set of user identity information corresponds to one or more remote location transactions previously performed by the user using the mobile device,
      wherein each of the remote location transactions previously performed includes transmitting user identity data from the mobile device through an electronic medium and storing corresponding data for the remote location transaction in an internal storage of the mobile device, and
      wherein retrieving second set of user identity information from the mobile device comprises retrieving, from internal storage of the mobile device, for each of the remote location transactions previously performed using the mobile device, (a) a transaction type for each of the remote location transactions (b) a type of identity information provided by the user during each of the remote location transactions, and (c) a time for each of the remote location transactions;
   combining, by the processing center server, the first set of user identity information and the second set of user identity information into a single identity information record associated with the user, in an identity confidence database;
   determining, by the processing center server, an identity confidence score associated with the user, based on the first set of user identity information and the second set of user identity information, wherein when determining the identity confidence score, user identity information corresponding to in-person transactions performed by the user at physical transaction locations effect the determination of the identity confidence score differently than user identity information corresponding to remote location transactions performed by the user via the mobile device;
   receiving, by the processing center server, a request initiated by the user to perform at least one of an in-person or remote location transaction;
   determining, by the processing center server, whether or not to permit the requested transaction to be performed, based on a comparison of the identity confidence score associated with the user to a threshold; and
   in response to determining that the identity confidence score associated with the user exceeds the threshold, causing the requested transaction to be performed.

2. The method of claim 1, wherein retrieving the second set of user identity information comprises:
   capturing a mobile number of the mobile device associated with the user, using automatic number identification (ANI); and
   storing the mobile number of the mobile device associated with the user in an identity database.

3. The method of claim 1, wherein the requested transaction is a remote location transaction requested by the user via the mobile device, and wherein determining whether or not to permit the remote location transaction to be performed comprises:
   determining a location of the mobile device, in response to the request to perform the remote location transaction via the mobile device;
   comparing the location of the mobile device to a location threshold; and
   determining whether or not to permit the remote location transaction to be performed, based on the comparison of the location of the mobile device to the location threshold.

4. The method of claim 1, further comprising:
   determining a mobile number of the mobile device associated with the user;
   using the mobile number to retrieve data associated with the user from a cellular provider server, said data including at least one of a bill payment history associated with the user, or an amount of time with a cellular provider associated with the user; and
   determining a reliability metric for the second set of user identity information, based on the data received from the cellular provider server.

5. The method of claim 1, further comprising:
   retrieving data from a third-party mobile network operator (MNO) relating to mobile network usage of the user; and determining a reliability metric for the second set of user identity information, based on the data received from the MNO.

6. The method of claim 1, further comprising:
in response to the request to perform the requested transaction, selecting one of a plurality of re-verification processes for the user, wherein the selection of the re-verification process is based on the identity confidence score associated with the user; and
executing the selected re-verification process for the user, prior to determining whether or not to permit the requested transaction to be performed.

7. The method of claim 1, further comprising:
determining that a remote location transaction was initiated by the user via a web-based application;
wherein the second set of user identity information includes an internet protocol (IP) address and internet provider received via the web-based application, and
wherein a reliability metric for the second set of user identity information is determined based on the internet protocol (IP) address and internet provider received via the web-based application.

8. The method of claim 1, wherein determining whether or not to permit the requested transaction to be performed comprises:
determining a transaction type for the requested transaction;
determining whether the requested transaction is an in-person transaction or a remote location transaction; and
determining whether or not to permit the requested transaction to be performed, based on (a) the transaction type for the requested transaction, (b) whether the requested transaction is an in-person transaction or a remote location transaction, and (c) the identity confidence score associated with the user.

9. The method of claim 1, wherein the identity confidence score associated with the user is further based on a frequency of previous in-person transactions and remote location transactions performed by the user.

10. The method of claim 1, wherein the identity confidence score associated with the user is further based on a determination of whether the first in-person transaction and the one or more remote location transactions performed by the user were successful or unsuccessful.

11. A system for establishing an identity confidence score, the system comprising:
a processing unit comprising one or more processors; and
one or more storage devices in communication with the processing unit and having sets of instructions stored thereon, wherein the sets of instructions when executed by the processing unit, cause the system to:
receive a first set of user identity information from a first transaction device, the first set of user identity information corresponding to a first in-person transaction performed by a user at a first physical transaction location,
wherein the first in-person set of user identity information comprises at least (a) a transaction type of the first in-person transaction and (b) a first type of identity information provided by the user during the first in-person transaction;
establish a remote wireless connection to a mobile device associated with the user;
retrieve a second set of user identity information from the mobile device associated with the user, via the remote wireless connection,
wherein the second set of user identity information corresponds to one or more remote location transactions previously performed by the user using the mobile device,
wherein each of the remote location transactions previously performed includes transmitting user identity data from the mobile device through an electronic medium and storing corresponding data for the remote location transaction in an internal storage of the mobile device, and
wherein retrieving second set of user identity information from the mobile device comprises retrieving, from internal storage of the mobile device, for each of the remote location transactions previously performed using the mobile device, (a) a transaction type for each of the remote location transactions (b) a type of identity information provided by the user during each of the remote location transactions, and (c) a time for each of the remote location transactions;
combine the first set of user identity information and the second set of user identity information into a single identity information record associated with the user, in an identity confidence database;
determine an identity confidence score associated with the user, based on the first set of user identity information and the second set of user identity information, wherein when determining the identity confidence score, user identity information corresponding to in-person transactions performed by the user at physical transaction locations effect the determination of the identity confidence score differently than user identity information corresponding to remote location transactions performed by the user via the mobile device;
receive a request initiated by the user to perform at least one of an in-person or remote location transaction;
determine whether or not to permit the requested transaction to be performed, based on a comparison of the identity confidence score associated with the user to a threshold; and
in response to determining that the identity confidence score associated with the user exceeds the threshold, causing the requested transaction to be performed.

12. The system of claim 11, wherein retrieving the second set of user identity information comprises:
capturing a mobile number of the mobile device associated with the user, using automatic number identification (ANI); and
storing the mobile number of the mobile device associated with the user in an identity database.

13. The system of claim 11, wherein the requested transaction is a remote location transaction requested by the user via the mobile device, and wherein determining whether or not to permit the remote location transaction to be performed comprises:
determining a location of the mobile device, in response to the request to perform the remote location transaction via the mobile device;
comparing the location of the mobile device to a location threshold; and
determining whether or not to permit the remote location transaction to be performed, based on the comparison of the location of the mobile device to the location threshold.

14. The system of claim 11, wherein the sets of instructions, when executed by the processing unit, further cause the system to:
- determine a mobile number of the mobile device associated with the user;
- use the mobile number to retrieve data associated with the user from a cellular provider server, said data including at least one of a bill payment history associated with the user, or an amount of time with a cellular provider associated with the user; and
- determine a reliability metric for the second set of user identity information, based on the data received from the cellular provider server.

15. The system of claim 11, wherein the sets of instructions, when executed by the processing unit, further cause the system to:
- retrieve data from a third-party mobile network operator (MNO) relating to mobile network usage of the user; and
- determine a reliability metric for the second set of user identity information, based on the data received from the MNO.

16. The system of claim 11, wherein the sets of instructions, when executed by the processing unit, further cause the system to:
- in response to the request to perform the requested transaction, select one of a plurality of re-verification processes for the user, wherein the selection of the re-verification process is based on the identity confidence score associated with the user; and
- execute the selected re-verification process for the user, prior to determining whether or not to permit the requested transaction to be performed.

17. The system of claim 11, wherein the sets of instructions, when executed by a processing unit, further cause the system to:
- determine that the remote location transaction was initiated by the user via a web-based application;
- wherein the second set of user identity information includes an internet protocol (IP) address and internet provider received via the web-based application, and
- wherein a reliability metric for the second set of user identity information is determined based on the internet protocol (IP) address and internet provider received via the web-based application.

18. The system of claim 11, wherein determining whether or not to permit the requested transaction to be performed comprises:
- determining a transaction type for the requested transaction;
- determining whether the requested transaction is an in-person transaction or a remote location transaction; and
- determining whether or not to permit the requested transaction to be performed, based on (a) the transaction type for the requested transaction, (b) whether the requested transaction is an in-person transaction or a remote location transaction, and (c) the identity confidence score associated with the user.

19. The system of claim 11, wherein the identity confidence score associated with the user is further based on a frequency of previous in-person transactions and remote location transactions performed by the user.

20. The system of claim 11, wherein the identity confidence score associated with the user is further based on a determination of whether the first in-person transaction and the one or more remote location transactions performed by the user were successful or unsuccessful.

* * * * *